Patented May 8, 1928.

1,669,242

UNITED STATES PATENT OFFICE.

RALPH V. HEUSER, OF PORTSMOUTH, NEW HAMPSHIRE, ASSIGNOR, BY MESNE ASSIGNMENTS, TO ALBERT C. BURRAGE, OF BOSTON, MASSACHUSETTS.

PROCESS OF MAKING PHENYLORTHOTOLYLGUANIDINE.

No Drawing.    Application filed February 27, 1923. Serial No. 621,680.

This invention relates to the vulcanization of rubber and more particularly to an improved accelerator useful in the vulcanizing process and to a process of preparing such accelerator.

In the manufacture of rubber, organic accelerators are commonly employed to hasten the vulcanizing process and among such accelerators the various substituted guanidines have found especial favor among rubber manufacturers. I have now discovered a certain group of compounds which possess all the characteristics desirable in a rubber accelerator and in whose preparation a by-product of the manufacture of paratoluidine may effectively be utilized. These new compounds are of especial interest in that they are guanidine derivatives having an aryl radical substituted for one hydrogen atom of one amino group and a different aryl radical in place of a hydrogen atom of the other amino group.

The substance phenylorthotolylguanidine is cited as a specific instance of the genus of compounds which I refer to. This is a definite chemical compound, having the formula

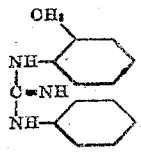

It is a white, fluffy, non-hygroscopic powder having a melting point of 130.3° C. and does not become gummy on heating.

As a first step in the process of producing this substance, aniline ($C_6H_5.NH_2$) and orthotoluidine ($C_6H_4(NH_2).CH_3$) in molecular proportions, with an excess of carbon bisulphide ($CS_2$), are caused to react with each other, the action proceeding according to the following equation:

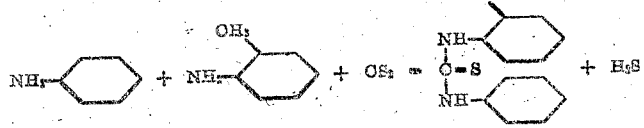

This compound, having an aryl radical substituted for a hydrogen atom in one amino group and an unlike aryl radical in place of a hydrogen atom in its other amino group may properly be termed "phenyltolylthiourea" when, as in this specific example, the unlike radicals are phenyl and tolyl, respectively. This new compound has a melting point of approximately 132° C. and the yield from the above described reaction is nearly that which should theoretically be obtainable.

The second step of the process may be carried out in various ways. In accordance with one, the finely pulverized phenyltolylthiourea is treated with alcoholic ammonia and litharge at a relatively low temperature, and with vigorous agitation, the reaction taking place in accordance with the equation

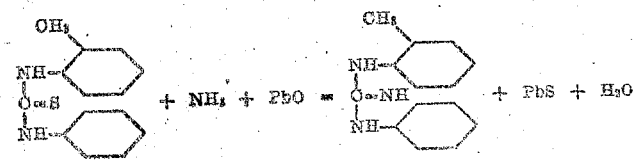

In accordance with another method, which is preferred, the pulverized phenyltolylthiourea is allowed to react with ammonium nitrate and lead oxide in the presence of an organic solvent, such for example as alcohol, as represented by the following equation:

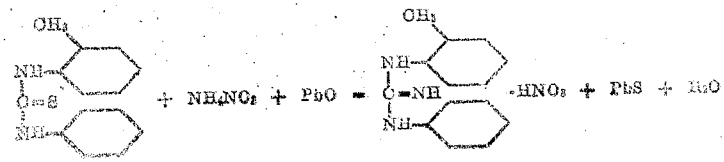

The resulting substituted guanidine-nitrate salt is afterward converted according to well known methods into phenylorthotolyl-guanidine base, which is a definite chemical compound of the formula

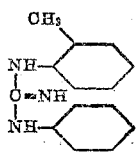

and having the properties aforementioned.

I claim:

That method of preparing phenylorthotolylguanidine which comprises treating aniline and orthotoluidine in molecular proportions with carbon bisulphide to form phenylorthotolylthiourea and by desulphurization converting the latter into a substituted guanidine.

Signed by me at Boston, Massachusetts, this 20th day of February 1923.

RALPH V. HEUSER.